United States Patent [19]
Somers

[11] Patent Number: 5,406,156
[45] Date of Patent: Apr. 11, 1995

[54] ELECTRODYNAMIC MACHINE HAVING SELF-ALIGNING HOUSING MOUNTING SYSTEM

[75] Inventor: James P. Somers, Redfield, Ark.

[73] Assignee: Siemens Energy & Automation, Inc., Alpharetta, Ga.

[21] Appl. No.: 71,809

[22] Filed: Jun. 2, 1993

[51] Int. Cl.⁶ .................. H02K 5/00; H02K 5/04; H02K 5/26
[52] U.S. Cl. ................................ 310/89; 310/91
[58] Field of Search ............ 310/62, 63, 89, 90, 310/68 B, 91, 68 R

[56] References Cited

U.S. PATENT DOCUMENTS

| | | | |
|---|---|---|---|
| 1,026,904 | 5/1912 | Burke | 310/89 |
| 3,524,089 | 8/1970 | Willits | 310/60 |
| 4,074,156 | 2/1978 | Widstrand et al. | 310/62 |
| 4,339,871 | 7/1982 | Magnaghi | 310/89 |
| 4,399,380 | 8/1983 | Hirano | 310/89 |
| 4,959,574 | 9/1990 | Suzuki et al. | 310/91 |
| 5,134,329 | 7/1992 | Lang | 310/63 |
| 5,203,656 | 4/1993 | McKinlay | 411/149 |
| 5,209,444 | 5/1993 | Rinderer | 248/205.1 |
| 5,210,453 | 5/1993 | Nelson | 310/51 |
| 5,258,675 | 11/1993 | Nelessen | 310/91 |
| 5,293,125 | 3/1994 | Griffen et al. | 310/68 B |

FOREIGN PATENT DOCUMENTS

| | | | |
|---|---|---|---|
| 613721 | 1/1961 | Canada | 310/62 |

*Primary Examiner*—Steven L. Stephan
*Assistant Examiner*—Clayton E. LaBalle
*Attorney, Agent, or Firm*—Peter A. Luccarelli, Jr.

[57] ABSTRACT

An electrodynamic machine, such as an electric induction motor (10), has a frame (12); at least one bearing housing (16) attached to the frame, including a bearing (18); and a shaft (14) rotatively mounted to the bearing within the frame. A second housing, such as a fan housing (20), defines at least one generally tapered, mating shoulder surface (24). The second housing is attached to the bearing housing along a fixed reference plane with respect to the shaft centerline. The device has at least one fastener (26, 28) defining a generally tapered shoulder surface (40), which abuts the corresponding second housing shoulder surface (24) as the fastener is tightened. At least one of the abutting second housing (24) and fastener (40) shoulder surfaces defines a convex tapered portion and the other of the respective abutting shoulders (24, 40) defines a concave tapered portion, so that tightening the fastener registers the second housing portion along the reference plane. The motor achieves self-registration of the housing with respect to a desired reference plane as the housing is installed during manufacture or reinstalled during subsequent servicing, so that instrumentation devices, such as tachometers (42), that are attached to the housing are registered in a desired position with respect to the reference plane.

19 Claims, 4 Drawing Sheets

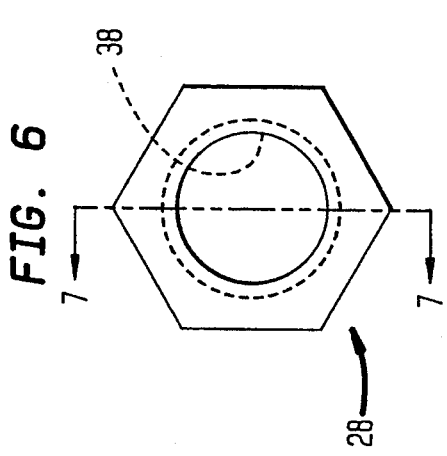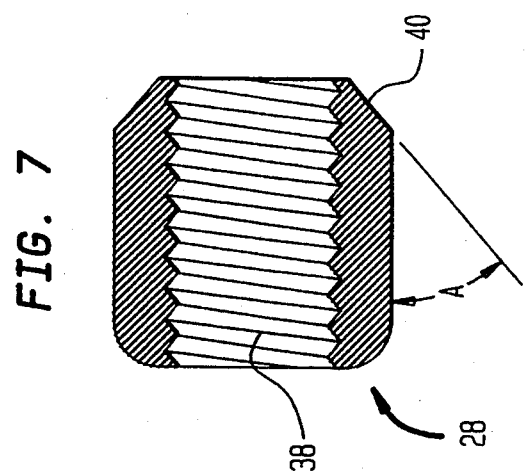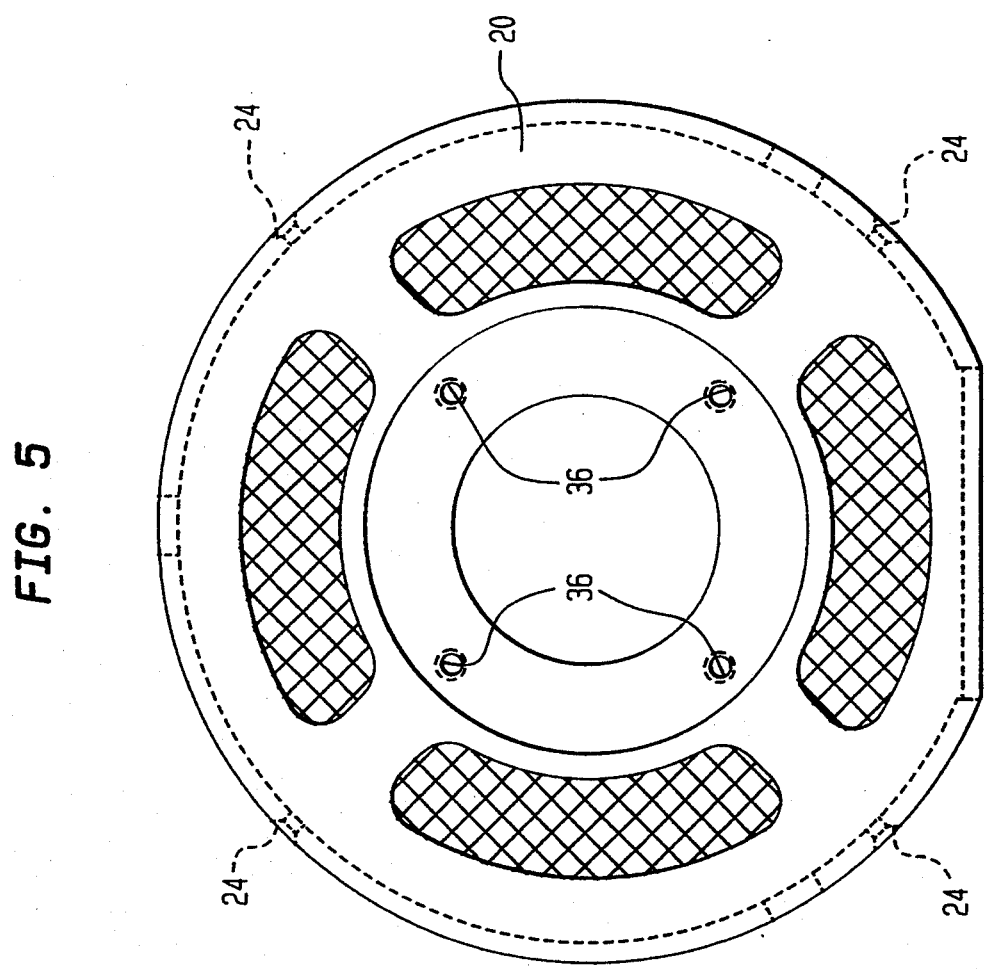

ELECTRODYNAMIC MACHINE HAVING SELF-ALIGNING HOUSING MOUNTING SYSTEM

BACKGROUND OF THE INVENTION

This invention is directed to housing mounting systems for electrodynamic machines, for example, housing mounting systems for induction motors.

Electrodynamic machines, such as electric induction motors, often have housings for separating internal components of motors from the outside environment and for structural support of motor components and auxiliary devices which may be selectively attached to the motor.

It is becoming more common in the industry to couple sensing devices and related instrumentation to electrodynamic machines, such as induction motors, in order to integrate the motors into monitoring and control systems. Many of these known sensing devices require precise registration with respect to a fixed, selected reference plane on the motor. By way of non-limiting example, motor tachometers employ sensors which require alignment with the motor shaft centerline. The tachometer will not give proper readings unless the alignment is achieved. The tachometer sensor is often attached to an instrumentation device mount which is in turn attached to a selected motor housing. By way of further example, some motors manufactured and sold by the Motors and Drives Division of Siemens Energy & Automation, Inc., assignee of this patent application, are available with instrumentation device mounts attached directly to the motor fan housing proximal one end of the motor shaft.

In the past, either one or both of instrumentation device mounts and motor housings had to be manually aligned in order to assure that a selected instrumentation device was in proper alignment with a selected motor reference plane or axis. The manual alignment procedures would require expenditure of time and effort at the motor manufacturing facility or in the field after motor maintenance.

There is a need in the motor manufacturing industry to eliminate manual alignment procedures during motor manufacture, so as to reduce manufacturing costs. There is also a need to eliminate in-field housing re-alignment when the housing is removed by service technicians for field maintenance or repair.

It is an object of the present invention to create a self-aligning electrodynamic machine housing, which would eliminate the need for manual alignment during manufacture or during field servicing of the machine.

SUMMARY OF THE INVENTION

The above-identified needs and objects are met by the electrodynamic machine having self-aligning housing mounting system of the present invention. An electrodynamic machine, such as an electric induction motor, employing the present invention achieves self-registration of the housing with respect to a desired reference plane as the housing is installed during manufacture or reinstalled during subsequent servicing.

The present invention features an electrodynamic machine comprising a frame; at least one bearing housing attached to the frame, including a bearing; and a shaft rotatively mounted to the bearing within the frame, the shaft having a centerline. This aspect of the invention also has second housing which defines at least one generally tapered, mating shoulder surface, with the second housing attached to the bearing housing along a fixed reference plane with respect to the shaft centerline. The device has at least one fastener defining a generally tapered shoulder surface, which abuts the corresponding second housing shoulder surface as the fastener is tightened; with at least one of the abutting second housing and fastener shoulder surfaces defining a convex tapered portion and the other of the respective abutting shoulders defining a concave tapered portion, so that tightening the fastener registers the second housing portion along the reference plane.

Another aspect of the present invention features an electrodynamic machine comprising a frame; at least one bearing housing attached to the frame, including a bearing; and a shaft rotatively mounted to the bearing within the frame, the shaft having a centerline. The machine has a second housing which defines at least one generally tapered, mating shoulder surface, with the second housing attached to the bearing housing along a fixed reference plane with respect to the shaft centerline. The machine has at least one fastener defining a generally tapered shoulder surface, which abuts the corresponding second housing shoulder surface as the fastener is tightened; with at least one of the abutting second housing and fastener shoulder surfaces defining a convex tapered portion and the other of the respective abutting shoulders defining a concave tapered portion, so that tightening the fastener registers the second housing portion along the reference plane. The machine of this embodiment also has an instrumentation device mount attached to the second housing portion; and an instrumentation device having operating parameters responsive to alignment with the reference plane, attached to the instrument mount.

Another feature of the present invention is directed to an electrodynamic machine comprising a frame; at least one bearing housing attached to the frame, including a bearing; and a shaft rotatively mounted to the bearing within the frame, the shaft having a centerline. This machine has a fan housing which defines a plurality of generally tapered, mating shoulder surfaces oriented with radial symmetry about the fan housing, with the fan housing attached to the bearing housing along a fixed reference plane with respect to the shaft centerline. The machine has a plurality of fasteners each defining a generally tapered shoulder surface, which abuts a respective corresponding fan housing shoulder surface as the fastener is tightened. At least one of each pair of respective, corresponding abutting fan housing and fastener shoulder surfaces defines a convex tapered portion and the other of the respective abutting shoulders defines a concave tapered portion, so that tightening the fasteners registers the fan housing along the reference plane. The machine also has an instrumentation device mount attached to the second housing portion.

DESCRIPTION OF THE DRAWINGS

FIG. 5 is an end elevational view of an alternate embodiment of the fan housing of the present invention.

FIG. 6 is a top end view of the housing fastener of the present invention.

FIG. 7 is a sectional view of the housing fastener taken along 7—7 of FIG. 6.

DESCRIPTION OF THE PREFERRED EMBODIMENTS

Figure 1:
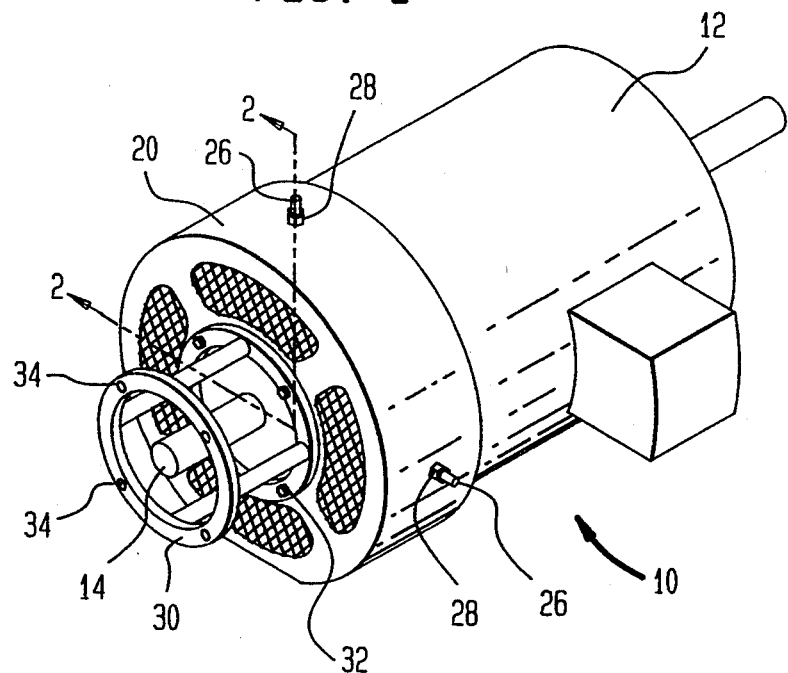
FIG. 1 is a perspective view of an electric induction motor having the self-aligning housing mounting system of the present invention with an instrumentation device mount attached to the fan housing.
Figure 2:
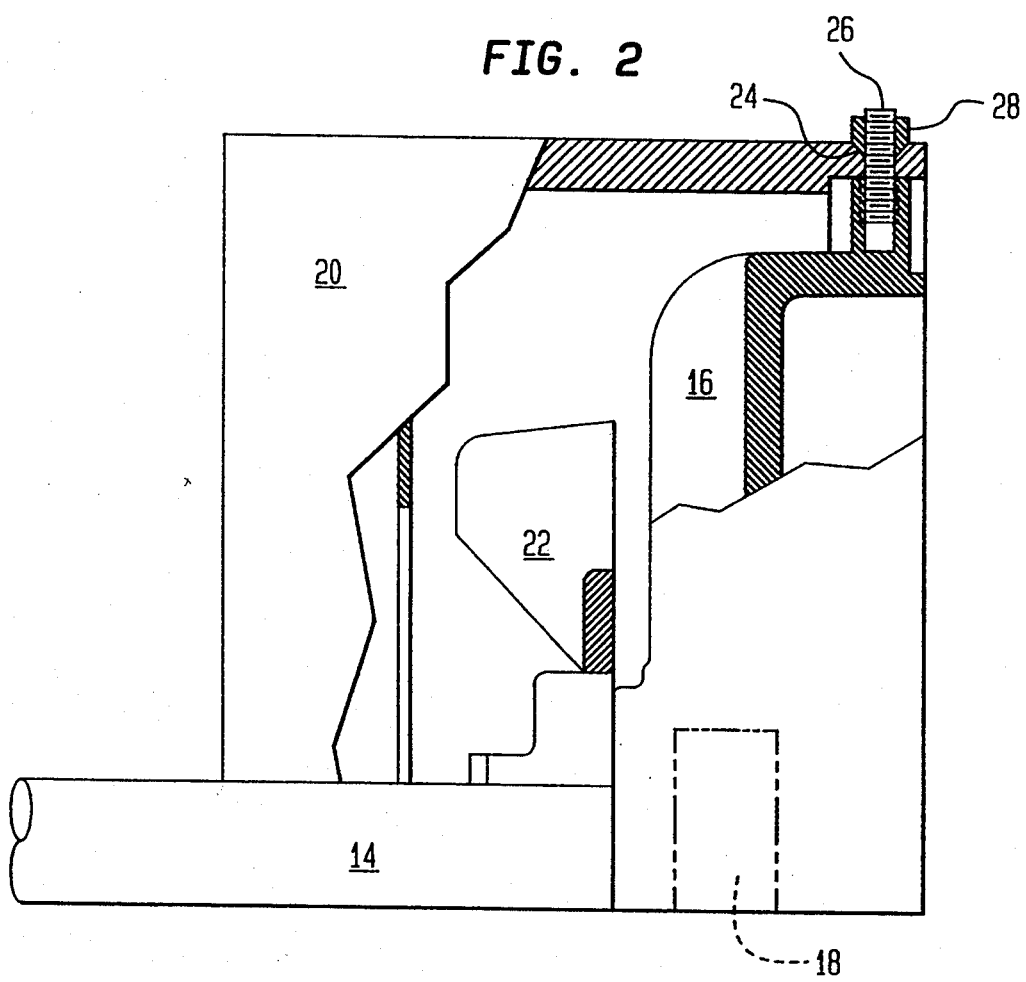
FIG. 2 is a partial sectional elevational view taken along 2—2 of FIG. 1, showing assembly of the housing mounting system of the present invention.

Referring generally to FIGS. 1 and 2, an electric induction motor 10 is shown. The motor 10 has a frame 12 and a shaft 14 for transmitting mechanical power generated by the motor. The configuration of the rotor and stator are not shown and are not considered material with respect to making or using the present invention.

Attached to the motor frame 12 is a bearing housing 16, which supports a bearing 18 for rotative mounting of the shaft 14. A second, fan housing 20 is attached to the bearing housing 16 and surrounds cooling fan 22. The fan housing 20 has at least one bevelled, tapered mating shoulder surface 24 and bore 25.

Stud 26 passed through fan housing bore 25 is anchored in a threaded bore within the bearing housing 16 after the fan housing 20 is aligned with the bearing housing. The stud 26 may be a threaded allen stud. Threaded tapered nut 28 is affixed to the stud 26 and rides against the fan housing shoulder surface 24. While a stud and tapered nut fastening system is shown, it should be understood that other fastening systems having a tapered surface for abutment against fan housing shoulder surface 24 may be utilized. For example, a bolt having a tapered shoulder surface could be substituted for the stud 26 and nut 28.

Referring to FIG. 1, an instrumentation device mount 30 is attached to fan housing 20 proximal one end of shaft 14 by way of bolts 32. Mount 30 has holes 34 for attachment of instrumentation devices thereto.

It is desirable to orient the instrumentation mount 30 concentrically with the shaft 14 centerline by threading bolts 32 into radially symmetrically-oriented fan housing threaded bores 36 (see FIG. 3), so that motor instrumentation devices can be easily oriented with respect to a known reference plane. It follows that if the fan housing 20 is oriented concentrically with the shaft 14 centerline, then the instrumentation mount 30 will also have the same concentric alignment with the shaft 14.

Figure 4:
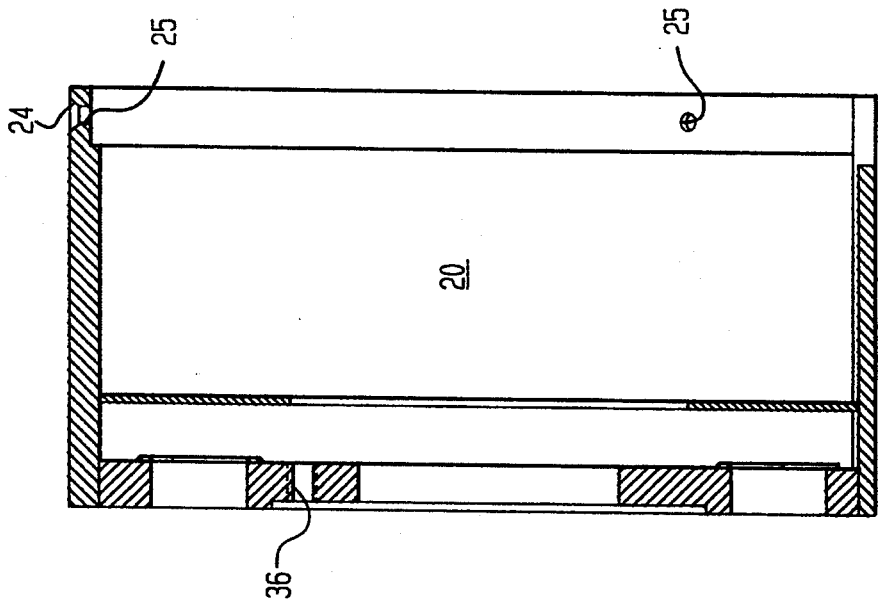
FIG. 4 is a sectional elevational view taken along 4—4 of FIG. 3.
Figure 3:
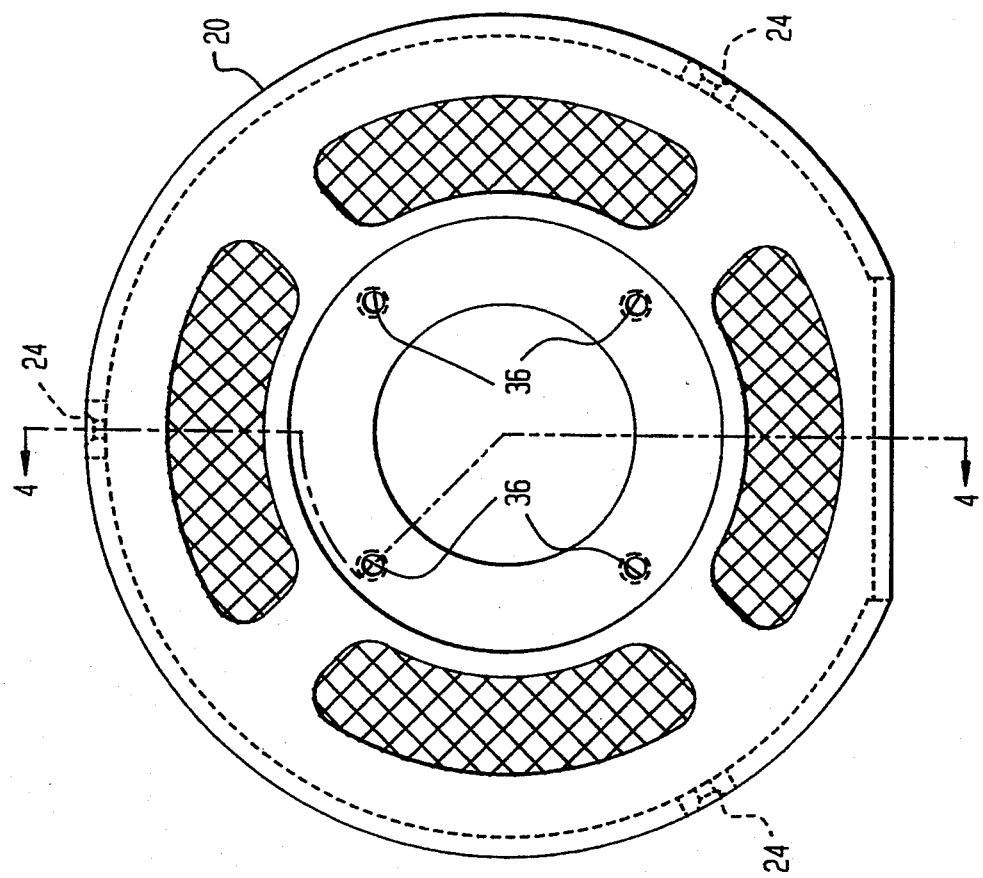
FIG. 3 is a end elevational view of the fan housing of the present invention.

As shown in FIGS. 3-5, the corresponding pairs of housing shoulder surfaces 24 and tapered nuts 28 fasteners are oriented symmetrically with respect to the fan housing. As shown in FIGS. 3 and 4, some embodiments orient three (3) nut fasteners 28 symmetrically by spacing them radially at an angle of 120 degrees along the same axial plane. The embodiment shown in FIG. 5 orients four (4) nut fasteners 28 symmetrically at a radial angle of 90 degrees along the same axial plane. Tightening the nut fasteners 28 against the housing shoulder surfaces 24 registers the housing concentrically with respect to the shaft 14, because the ring of symmetrically-oriented (both axially and radially) fasteners all lie on a plane that is perpendicular to the shaft centerline.

FIGS. 6 and 7 show the tapered nut fasteners 28 in greater detail. The nuts 28 have a hex profile for engagement with a wrench or other nut driving device and internal threads 38 which compliment the fastener stud 26 threads. The machined threads for the nuts 28 and studs 26 can be of any desired pitch which those skilled in the art deem appropriate for a particular application.

The tapered nut 28 also has a tapered shoulder comprising a bevelled surface 40 having any desired angle A. A suitable angle A is 41 degrees. It is also desirable, but not required to chrome plate the external surfaces of the nut 28 to a hardness of 68-72 on the Rockwell C scale. A suitable plating thickness is between 0.002-0.004 inches (0.051-0.102 millimeters).

As is shown in the figures, the fan housing 20 shoulder surfaces 24 have a concave-tapered profile and the fastener nut 28 bevelled shoulder surface 40 has a convex profile. Alternatively, the nut can be configured with a concave-tapered profile and the housing can be fabricated with a convex-tapered profile projecting radially outwardly from the fan housing outer circumferential surface.

Figure 8:
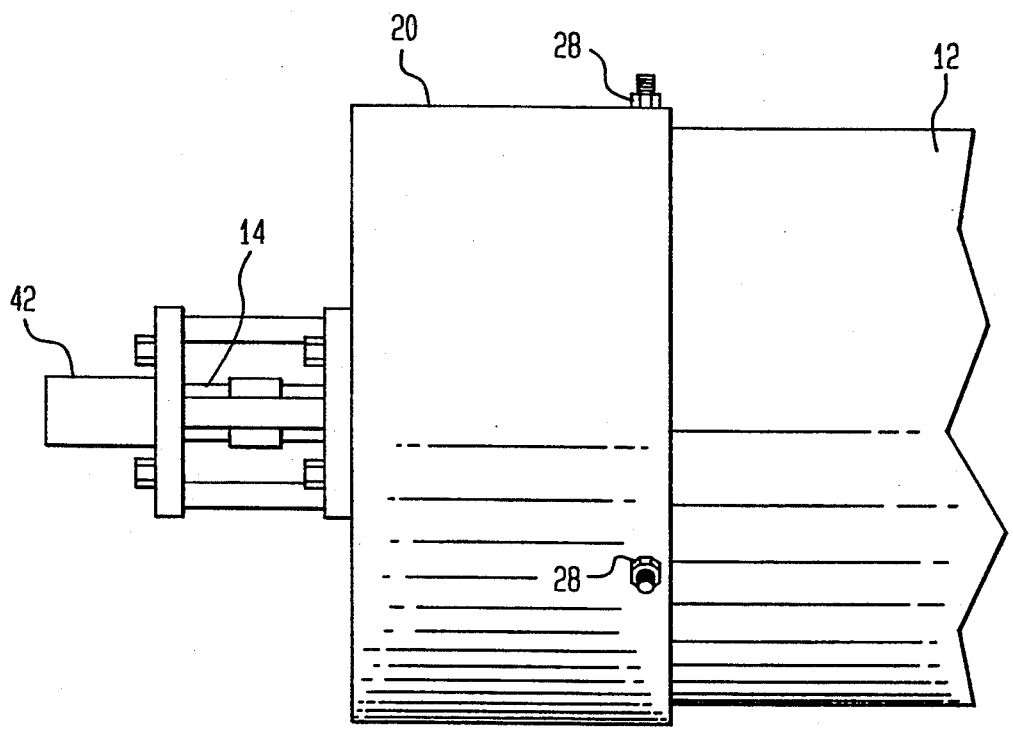
FIG. 8 is a schematic side elevational view of an electric induction motor having the self-aligning housing mounting system of the present invention with an instrumentation device attached to the instrumentation device mount proximal the motor shaft.

FIG. 8 shows schematically attachment of an instrumentation device 42, such as a tachometer, to the instrumentation mount 30. Customarily a guard is installed over the instrumentation mount 30 in order to isolate the exposed shaft 14 from the surrounding environment. A guard is not shown in order to simplify the drawing.

The present invention affords a simple and economical way to accomplish self-alignment of the fan housing 20 by mere tightening of tapered nut fasteners 28. While the present invention has been described with respect to preferred embodiments, it should be understood that the preferred embodiments are for illustrative purposes only and they should not be construed to limit the scope of the present invention, as set forth in the accompanying claims.

What is claimed is:

1. An electrodynamic machine comprising:
   a. a frame;
   b. at least one bearing housing attached to the frame, including a bearing;
   c. a shaft rotatively mounted to the bearing within the frame, the shaft having a centerline;
   d. a second housing attached to the bearing housing along a fixed reference plane with respect to the shaft centerline, the housing defining at least one generally tapered mating shoulder surface on an outer exposed surface periphery thereof which is oriented radially symmetrically with respect to the shaft centerline; and
   e. at least one fastener, oriented radially with respect to the shaft centerline, defining a generally tapered shoulder surface, which abuts the corresponding second housing shoulder surface as the fastener is tightened, at least one of the abutting second housing and fastener shoulder surfaces defining a convex tapered portion and the other of the respective abutting shoulders defining a concave tapered portion, so that tightening the fastener registers the second housing portion along the reference plane.

2. The electrodynamic machine of claim 1, wherein the second housing has a plurality of mating shoulder surfaces and a plurality of fasteners oriented radially symmetrically with respect to the shaft centerline.

3. The electrodynamic machine of claim 2, wherein the second housing has 3 mating shoulder surfaces and 3 fasteners.

4. The electrodynamic machine of claim 2, wherein the second housing has 4 mating shoulder surfaces and 4 fasteners.

5. The electrodynamic machine of claim 1, wherein the second housing has an instrumentation device mount attached thereto.

6. An electrodynamic machine comprising:
   a. a frame;
   b. at least one bearing housing attached to the frame, including a bearing;
   c. a shaft rotatively mounted to the bearing within the frame, the shaft having a centerline, the housing defining at least one generally tapered mating shoulder surface on an outer exposed surface periphery thereof which is oriented radially symmetrically with respect to the shaft centerline;
   d. a second housing which defines at least one generally tapered, mating shoulder surface, with the second housing attached to the bearing housing along a fixed reference plane with respect to the shaft centerline;
   e. at least one fastener, oriented radially with respect to the shaft centerline, defining a generally tapered shoulder surface, which abuts the corresponding second housing shoulder surface as the fastener is tightened, at least one of the abutting second housing and fastener shoulder surfaces defining a convex tapered portion and the other of the respective abutting shoulders defining a concave tapered portion, so that tightening the fastener registers the second housing portion along the reference plane;
   f. an instrumentation device mount attached to the second housing portion; and
   g. an instrumentation device having operating parameters responsive to alignment with the reference plane, attached to the instrumentation device mount.

7. The electrodynamic machine of claim 6, wherein the second housing has a plurality of mating shoulder surfaces and a plurality of fasteners.

8. The electrodynamic machine of claim 7, wherein the second housing has 3 mating shoulder surfaces and 3 fasteners.

9. The electrodynamic machine of claim 7, wherein the second housing has 4 mating shoulder surfaces and 4 fasteners.

10. The electrodynamic machine of claim 7, wherein the mating shoulder surfaces are oriented concentrically with respect to the shaft.

11. The electrodynamic machine of claim 6, wherein the second housing portion is a fan housing.

12. The electrodynamic machine of claim 6, wherein the instrumentation device is a tachometer.

13. An electrodynamic machine comprising:
   a. a frame;
   b. at least one bearing housing attached to the frame, including a bearing;
   c. a shaft rotatively mounted to the bearing within the frame, the shaft having a centerline;
   d. a fan housing which defines a plurality of generally tapered, mating shoulder surfaces oriented with radial symmetry about an outer, generally cylindrical periphery of the fan housing, with the fan housing attached to the bearing housing along a fixed reference plane with respect to the shaft centerline; and
   e. a plurality of fasteners each defining a generally tapered shoulder surface, which abuts a respective corresponding fan housing shoulder surface as the fastener is tightened, at least one of each pair of respective, corresponding abutting fan housing and fastener shoulder surfaces defining a convex tapered portion oriented with radial symmetry with respect to centerline and the other of the respective abutting shoulders defining a concave tapered portion, so that tightening the fasteners registers the fan housing along the reference plane; and
   f. an instrumentation device mount attached to the fan housing portion.

14. The electrodynamic machine of claim 13, wherein the fan housing has 3 mating shoulder surfaces and 3 fasteners.

15. The electrodynamic machine of claim 13, wherein the fan housing has 4 mating shoulder surfaces and 4 fasteners.

16. The electrodynamic machine of claim 13, wherein the mating shoulder surfaces are oriented concentrically with respect to the shaft.

17. The electrodynamic machine of claim 13, wherein the fan housing mating shoulder surfaces have the concave profile and the fastener shoulder surfaces have the convex profile.

18. The electrodynamic machine of claim 13, wherein at least one of the fasteners comprises a threaded stud inserted into a threaded bore defined within the bearing housing and a tapered nut threaded onto the stud.

19. The electrodynamic machine of claim 13, further comprising an instrumentation device having operating parameters responsive to alignment with the reference plane, attached to the instrument mount.

* * * * *